J. S. FULLERTON.
WAGON BRAKE LEVER.
No. 181,430.  Patented Aug. 22, 1876.
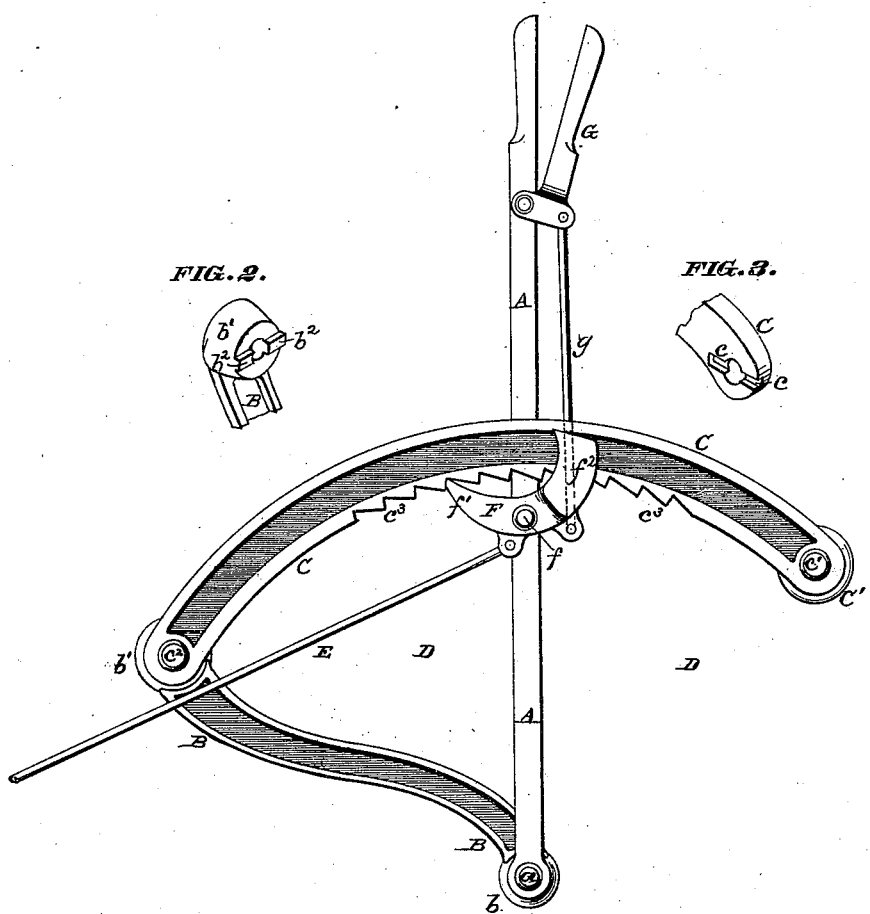
ATTEST:
Robert Burns.
Le Blond Burdett
INVENTOR:
James S. Fullerton
By Knight Bros.
Attys.

UNITED STATES PATENT OFFICE.

JAMES S. FULLERTON, OF ST. LOUIS, MISSOURI.

IMPROVEMENT IN WAGON-BRAKE LEVERS.

Specification forming part of Letters Patent No. 181,430, dated August 22, 1876; application filed July 1, 1876.

*To all whom it may concern:*

Be it known that I, JAMES S. FULLERTON, of the city and county of St. Louis, and State of Missouri, have invented a certain new and useful Improvement in Wagon - Brakes, of which the following is a full, clear, and exact description, reference being had to the accompanying drawing, making part of this specification.

This invention relates to that class of wagon-brakes in which the strain of the draw-rod tends to hold the dog to engagement with the sector-ratchet, by which the hand-lever is held forward.

In this invention the pawl or dog pivoted to the hand-lever, and to whose lower part the draw-rod is connected, has its front end weighted, so that when the lever is moved so far forward that the draw-rod partially ceases in its above-described action on the pawl or dog, the weight at the forward end of the dog shall act to throw up the rear end of the dog into engagement with the ratchet.

This invention also applies to the construction of the ratchet-sector. This is made in two pieces, namely, the bracket and the sector, and as it is necessary that the sector should be concentric with the lever-axis, the bracket is cast with a tenon which enters a recess in the sector, so as to insure the parts being put together in the proper relative position upon the wagon-box, and also to insure the parts remaining in proper relative position with each other.

In the drawings, Figure 1 is a side view. Figs. 2 and 3 are perspective views, showing the tenon or tongue, and the groove to receive it on the sector-ratchet, respectively.

A is the brake-lever, pivoted at $a$ to the bracket-piece B. This bracket-piece is formed with raised heads or projections $b$ $b^1$, to which the brake-lever A and locking-sector C are attached. The head $b^1$ is provided with a tongue, $b^2$, which engages in a groove, $c$, of the ratchet-sector and guide C. The attachment $b^2$ $c$ insures the proper relative position of the parts B C. C' is a head at the front end of C, which lies against the side of the wagon-body D, and through which passes a rivet or bolt, $c^1$, by which, and those $c^2$, the brake is attached to the wagon-body. E is the draw-bar, extending from the brake-bar (not shown) to the lower part of the dog F. The dog is pivoted to the lever A at $f$. This pawl or dog has a rearwardly-projecting end, $f^1$, which engages in the ratchet-teeth $c^3$ of the guide or ratchet-sector C. $f^2$ is the forward end of the dog, and this is made heavy, so as to act as a weight to carry the point $f^1$ upward in contact with the ratchet-teeth $c^3$.

It will be observed that when the lever A is thrown far forward, the points of oscillation of the dog and attachment of the draw-bar E are nearly in line with said draw-bar, and consequently there would not be much tendency in the bar under strain to force up the end $f^1$. Now, to compensate for this failure of the rod to raise the end $f^1$, this feature of loading the forward end at $f^2$ is introduced, for it will be seen that when the lever is in the forward position the weight acts with increased force.

G is a bell-crank lever, fulcrumed at the upper part of the lever A, and connected by a draw-rod, $g$, to the forward part of the dog F, so that as the lever G is drawn back to that A, the front end of the dog is raised, and the rear end drawn down out of engagement with the ratchet-teeth $c^3$, and the lever A can then be thrown back to remove the brake-rubbers from the wheels.

I claim as new and of my invention—

1. The dog F, provided with a weight, $f^2$, at its front end, in combination with the brake-lever A, ratchet-sector C, and draw-rod E, substantially as and for the purpose set forth.

2. The ratchet-sector C, having groove $c$, in combination with the bracket-piece having tongue $b^2$, as and for the purpose set forth.

JAMES S. FULLERTON.

Witnesses:
SAML. KNIGHT,
ROBT. BURNS.